United States Patent [19]

Kennedy, Jr.

[11] Patent Number: 5,071,175
[45] Date of Patent: Dec. 10, 1991

[54] PIPE RESTRAINER

[76] Inventor: Harold Kennedy, Jr., 18 Fox Hollow, Eastland, Tex. 76448

[21] Appl. No.: 538,121

[22] Filed: Jun. 14, 1990

[51] Int. Cl.$^5$ ............................................. F16L 19/08
[52] U.S. Cl. ................................... 285/337; 285/374; 285/404
[58] Field of Search ............... 285/337, 342, 368, 403, 285/413, 420, 404, 374

[56] References Cited

U.S. PATENT DOCUMENTS

| | | | |
|---|---|---|---|
| 3,941,410 | 3/1976 | Miyaoka | 285/342 X |
| 4,092,036 | 5/1978 | Sato et al. | 285/337 |
| 4,127,290 | 11/1978 | Hutschlechner | 285/374 X |
| 4,417,754 | 11/1983 | Yamaji | 285/337 X |
| 4,647,083 | 3/1987 | Hashimoto | 285/403 X |
| 4,664,426 | 5/1987 | Ucki | 285/337 |
| 4,848,808 | 7/1989 | Pannell et al. | 285/4 |

Primary Examiner—Randolph A. Reese
Assistant Examiner—Heather Chun
Attorney, Agent, or Firm—Johnson & Gibbs

[57] ABSTRACT

A pipe restraining mechanism for use in a pipe retainer gland to secure the gland on a pipe such as PVC pipe and ductile iron pipe including a housing forming a part of the retainer gland and having a pocket therein opening inside of the gland, a wedge operator member on the top wall of the housing, and a pipe gripping wedge in the housing pocket having inside teeth for engagement with the outer surface of a pipe and adapted to be initially mechanically pressed into a pipe surface by the operator member and thereafter fully engaged with the pipe surface responsive to hydraulic pressure in the pipe causing a wedging action with the operator member and thereafter a turning action between the wedge and a housing surface to drive the wedge teeth into the pipe surface and seat the wedge on the pipe surface.

40 Claims, 5 Drawing Sheets

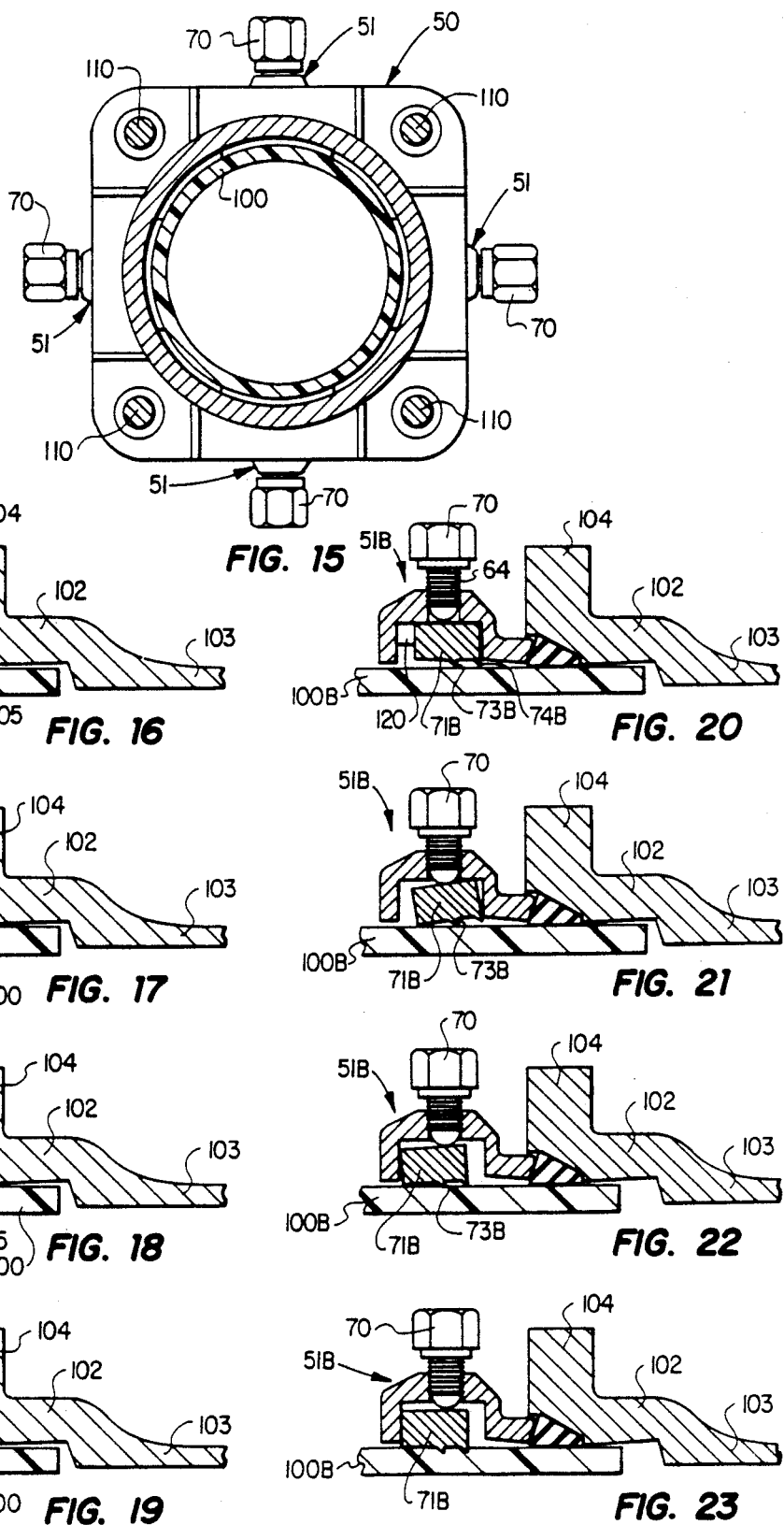

PIPE RESTRAINER

BACKGROUND OF THE INVENTION

1. Field of the Invention

This invention relates to restraining apparatus and more particulary relates to a restraining mechanism which holds a pipe or conduit at a connection with another pipe, valve housing, or similar member coupled with the pipe.

2. History of the Prior Art

Various apparatus and techniques have been used for many years to couple pipe of all types with other pipe, valves, various pipe fittings, hydrants, and miscellaneous connections where pipe is secured to another member and thereafter subjected to internal fluid pressure which tends to separate the pipe from the member to which it is coupled. Typical uses for a variety of such pipe devices are sewer systems, water distribution systems, and the like. While such pipe systems have often used ductile iron pipe, it has become very common in recent years to also use plastic pipe such as pipe made from polyvinyl chloride, usually referred to as PVC pipe. It is also been common in such systems to use fittings and valves made primarily for use with cast and ductile iron pipe. The principal problem presented by such joints is gripping or grasping the pipe. Pipe joint restraining devices relying on friction alone are very unpredictable. To restrain reasonable amounts of internal pressure in pipe, it has been found necessary to create a groove in the surface of the pipe deep enough and wide enough to provide adequate shear strength to resist large axial loads created by the pressure. The soft character of PVC pipe has made it necessary to create grooves around the outer surface of the pipe over a major portion of its circumference without either damaging the pipe or reducing the capability of the pipe to withstand pressure. To create a system using PVC pipe to resist high axial loads it is necessary to provide at least one groove of sufficient depth for almost the entire circumference of the pipe. More than one groove arranged in parallel relation can also be used. To create a system to resist high axial loads without damaging the pipe it has been necessary to keep the radial loads on the pipe to a minimum and to reduce the radial loads after the groove has been formed. The mechanism used to form the restrainer connection with the pipe must include thrust resisting engaging means which remain in the groove or grooves around the pipe.

A substantial number of prior art patents show a wide variety of apparatus and methods for attachment to grip a pipe. Several devices have used an inclined plane to create enough mechanical advantage to grip a pipe to prevent separation. See the following U.S. Pat. Nos.: Gammeter, 1,898,623, Yano, 3,594,023, Sato, 3,937,500, Felker, 4,070,046, Yamaji, 4,417,754, and Hattori, 4,438,954. These devices provide no limit to the travel of the wedging member and thus there is little or no limit to the radial deflection of the pipe ring due to the extreme radial force. Also, these devices require extremely strong rings and pipe if high pressures and large diameter pipe are restrained.

Babb, U.S. Pat. No. 3,920,270 provides a front flange on his grip ring which could be used as a limit to the travel of the wedge. However, if the pressure continues to increase after the wedge reaches its limit, the result is a toggle which creates extreme radial force on the pipe as the wedge overturns.

Sato, U.S. Pat. No. 4,092,036, shows a wedging action with a limit in the form of a rear wall in a housing which contacts the wedge at the rear and thus stops the travel of the wedge. Actual experience with this device used on ductile-iron as well as PVC pipe indicates that because of the oval shaped hole in the top of the housing a toggle action around the intersection of features 28 and 43 in FIG. 7a as a pivot point allows the rear tooth to disengage and the front tooth to dive into the pipe. This action increases the radial stress in large diameter pipe at very high pressures, i.e., 500 psi.

Toggling has also been used to grip the surface of the pipe in joint restraint designs. Dillon, U.S. Pat. No. 1,930,194, Hashimoto, U.S. Pat. No. 4,647,083 and Moussiaux, British Patent 1,403,671, show toggling or Belleville spring devices. Toggling involves pivoting about a point slightly off the vertical center line of the mechanism. As the pivot point passes the vertical, deflection of the pipe or the groove usually remains. In Hashimoto, for a 12 inch pipe and a 1 inch toggle arm the maximum groove depth would be approximately 0.026 inch.

The key to a reliable restraint device for PVC pipe, especially on larger diameters, is the ability to reliably create these grooves. Other devices such as those described in Roche, U.S. Pat. No. 4,336,959 and Bradley, U.S. Pat. No. 4,568,112 form grooves in the pipe with side bolts connecting two half rings. This does not produce enough force to reliably create multiple grooves completely around a large diameter pipe such as 12 inch through 30 inch pipe. The result is slippage on the pipe and premature failure. Tests on large diameter versions of these devices have shown that grooves are created only near the side bolts. When the pressure is increased, shear failures in these limited grooves cause sudden slippage and impact on the highly stressed PVC pipe. The result is sudden premature bursting of the pipe itself at pressures well below those required by the AWWA standard.

SUMMARY OF THE INVENTION

It is a principal object of the invention to provide a new and improved mechanism for restraining pipe against the force of internal pressure at a connection of the pipe with another pipe or other members such as a valve.

It is another object of the invention to provide pipe restraining mechanism which is useful with both plastic pipes such as PVC pipe and various forms of metal pipe.

It is another object of the invention to provide pipe restraining mechanism which is especially adapted to use with PVC pipe.

It is another object of the invention to provide PVC pipe restraining mechanism which will neither damage the pipe nor reduce the capability of the pipe to withstand internal pressure.

It is another object of the invention to provide pipe restraining mechanism which creates the necessary grooves to an restrain high pressures in PVC and ductile iron pipe while reducing the radial force required to create the grooves to absolute minimum after the groove has been cut allowing the thrust resisting engaging member or wedge to rest in a groove with little of the radial force required to originally cut the groove.

It is another object of the invention to provide a pipe restraining mechanism which lowers the stress in the housing ring or gland around the pipe while preserving the strength of the pipe wall and gland to resist axial thrust and internal pressure.

It is another object of the invention to provide pipe restraining mechanism using a pipe gripping wedge which is initially engaged with the pipe by mechanical torque action and thereafter further engaged with the pipe through wedging and additional torque action responsive to axial thrust in the pipe generated by internal fluid pressure in the pipe.

It is another object of the invention to provide pipe restraining mechanism which employs minimum static load on the pipe once the mechanism is engaged with the pipe and thereafter more tightly grips the pipe responsive to and in proportion to the hydraulic pressure in the pipe.

In accordance with the invention there is provided a pipe restraining mechanism which includes a wedge housing adapted to be mounted at a pipe surface to be gripped, the wedge housing having a wedge pocket therein, a wedge operator member, a screw or surface protrusion, in the housing extendable into the top of the pocket for operating a pipe gripping wedge in the pocket, and a pipe gripping wedge in the pocket having at least one pipe surface engaging tooth across the bottom of the wedge, the operator member engaging the top surface of the wedge along a line spaced from the wedge tooth to provide a moment arm for rotating the wedge to initially engage the back corner of the wedge and tooth with the pipe surface and hold the wedge at an angular position for subsequent wedging action between the pipe surface, the wedge, and the operator member, to further penetrate the pipe surface with the wedge tooth, and thereafter to further rotate the wedge about an axis along a line of engagement of back upper corner of the wedge with a back wall of the pocket for maximum engagement of the wedge tooth and bottom surface of the wedge with the pipe surface, the wedging action, and final torque step being produced responsive to hydraulic pressure in the pipe. The restrainer mechanism is used in mechanical and push-on pipe joints with flanges, and in couplings, and the like. The restraining mechanisms are mounted in circumferentially spaced relation around a pipe, the number of mechanisms employed depending upon the diameter of the pipe.

BRIEF DESCRIPTION OF THE DRAWINGS

The details of specific embodiments of the invention and the foregoing objects and advantages will be better understood from the following description taken in conjunction with the accompanying drawings wherein:

FIG. 15 is a view in section and elevation along the line 15—15 of FIG. 13;

FIG. 16 is a fragmentary view in section and elevation of the mechanism of the invention in use as illustrated in FIG. 13 at the initial stage of operation at which the pipe gripping wedge has not yet been activated;

FIG. 17 is a fragmentary view in section and elevation similar to FIG. 16 showing a first step in the operation of the wedge in which the operator screw has pressed the wedge downwardly and rotated the wedge toward the back wall of the pocket of the wedge housing;

FIG. 18 is a fragmentary view in section and elevation similar t FIG. 17 showing the next step in the operation of the wedge responsive to hydraulic pressure in the pipe illustrating the wedge moved rearward and downwardly into the pipe surface and a wedge tooth embedded farther into the pipe surface;

FIG. 19 is a fragmentary view in section and elevation similar to FIG. 18 showing the final step in the operation of the wedge illustrating the wedge bottom surface against the pipe surface, the back face of the wedge engaging the back wall surface of the wedge pocket, and the wedge teeth fully embedded in the pipe surface;

FIG. 20 is a fragmentary view in section and elevation of the pipe restraining mechanism of the invention as illustration in FIG. 16 when used on a metal pipe such ductile iron, illustrating a wedge spacer in the pocket for holding the wedge in the forward position during assembly and the first step of wedge operations;

FIG. 21, 22, and 23, are fragmentary views in section and elevation similar to FIG. 20 illustrating the sequential steps in the operation of the mechanism as shown FIGS. 17-19, respectively.

Referring to FIG. 1, a pipe restraining mechanism assembly or retainer gland 50 includes four circumferentially spaced pipe restraining mechanisms 51 embodying the features of the invention. It will be understood that the number of the mechanisms 51 will depend upon the diameter of the pipe on which the gland is mounted. The four pipe mechanisms 51 illustrated in FIG. 1 are identical in construction. For purposes of illustration and description specific details of only the bottom mechanism 51 as illustrated in FIG. 1 are shown and will be described in relation to FIGS. 2-7 inclusive.

It is to be understood that in describing the pipe restraining mechanism 51 the terms "front", "top", "back", and "bottom", are used solely as matters of definition and are selected based upon the orientation of the mechanism 51 as illustrated in FIGS. 16-23 to facilitate a better understanding of the sequential operation or the progressive steps in the operation of the pipe gripping wedge described and illustrated for the reference to FIGS. 16-23. It will be apparent therefore that since the retainer gland shown in FIG. 1 includes four of the mechanisms 51, the use of the terms "front", "top", etc, are meaningless in terms of the actual positions of the mechanisms in the retainer gland. Further, the bottom mechanism 51 in FIGS. 1-7 is inverted in terms of the mechanism 51 shown in FIGS. 16-23. Referring to FIGS. 1-4 and 13, the pipe restraining mechanism 51 includes a wedge housing 52 having a front wall 53, a top wall 54, and a back wall 55. The back wall is formed in three sections, 55a parallel to the front wall 53, and forwardly and outwardly divergent walls sections 55b. The wall sections 55b and the front wall 53 join side or end walls 60. The walls 60 are essentially perpendicular to the front wall 53 and parallel with each other. The inside faces or surfaces of the front and back walls 53 and 55 and the top wall 54 define a wedge pocket 61 which has an open bottom opposite the top wall 54. Each of the inside surfaces of the end walls 60 has a recess 62 which runs from the front to the back of the pocket in each end wall parallel with the top wall 54 for a purpose explained hereinafter.

Figure 1:
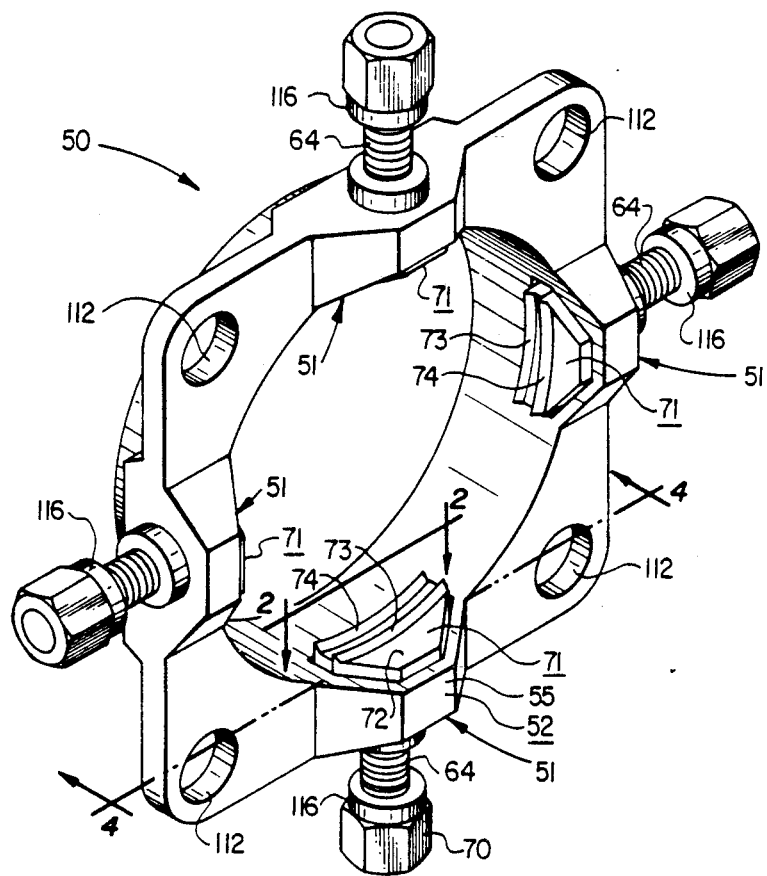
FIG. 1 is a view in perspective of a pipe joint retainer gland incorporating pipe restraining mechanisms embodying the features of the invention.

The top wall 54 of the housing 52 of the restraining mechanism 51 has an internally threaded screw hole 63 which passes through the top wall opening into the pocket along an axis perpendicular to the bottom surface of the top wall defining the top of the pocket. A wedge operating screw 64 is installed in the screw hole 63 and is rotatable to extend the end 65 of the operator screw into the pocket. The end of the screw 64 preferably has a spherical end surface 65 as seen in FIGS. 13 and 16-23. The operator screw has a head 70 which preferably is a limiting torque type assembly as illustrated and described in U.S. Pat. No. 4,627,774, issued to Earl T. Bradley, Dec. 9, 1986. As discussed hereinafter, the limiting torque type screw head allows the desired amount of torque to be applied to the operator screw when installing the pipe restraining mechanism 51 on a pipe. It is to be understood, however, that a fixed screw head may be used and the torque limited by turning the screw with a torque wrench.

Figure 5:
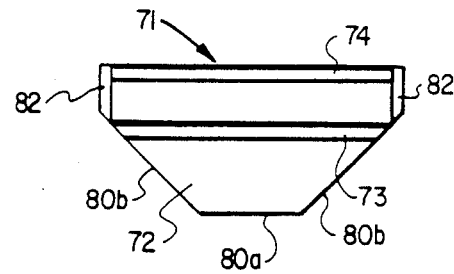
FIG. 5 is a top plan view of the pipe gripping wedge illustrated in FIGS. 1-4.
Figure 6:
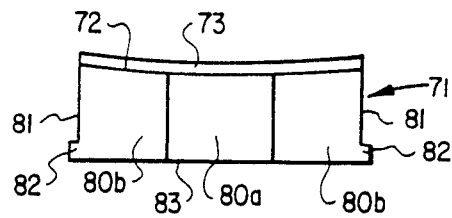
FIG. 6 is a back view in elevation of the wedge shown in FIG. 5.
Figure 7:
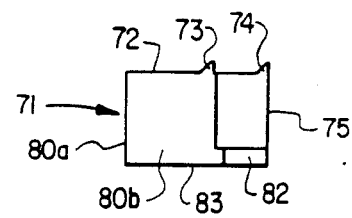
FIG. 7 is a right end view in elevation of the wedge as illustrated in FIG. 5 and 6.

A pipe gripping wedge 71 is installed in the housing pocket 61 for gripping the surface of a pipe on which the gland 50 is installed. The wedge is illustrated in detail in FIGS. 5-7. In FIGS. 5-7, the wedge 71 is illustrated in an inverted position from the position shown in FIGS. 13, and 16-23. The wedge had a bottom pipe engaging face 72 on which are formed pipe gripping teeth 73 and 74. The bottom face 72 and the teeth 73 and 74 are curved or arcuate to conform to the circular shape of the outer surface of a pipe on which the restraining mechanism is installed. The wedge has a front face 75 and back faces 80a and 80b which slope divergently forward from the back face 80a. The wedge has opposite side or end faces 81 and end latch or retainer flanges 82. The wedge has a top face 83.

Figure 2:
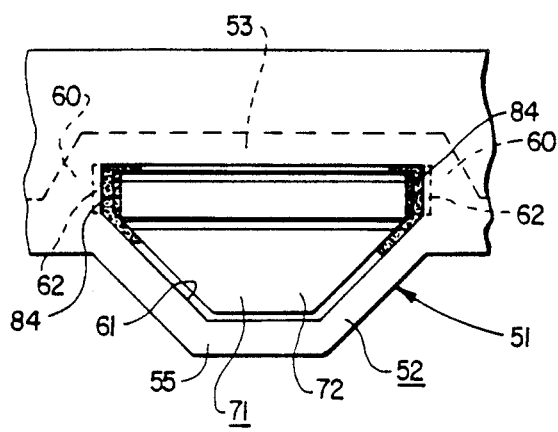
FIG. 2 is an enlarged fragmentary plan view along the line 2—2 of FIG. 1 showing a wedge housing and a pipe gripping wedge in the pocket of the housing.
Figure 3:
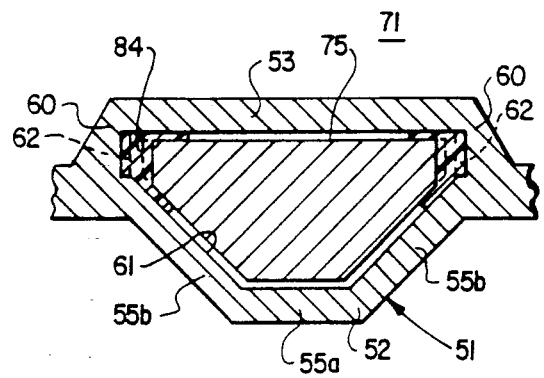
FIG. 3 is a view in section of the wedge housing and wedge illustrated along a plane parallel with the plane of illustration of FIG. 2 taken along a line 3—3 of FIG. 4.
Figure 4:
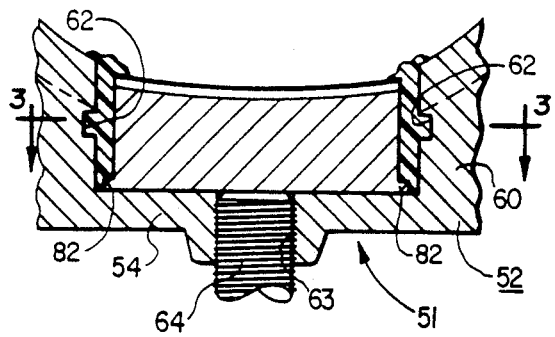
FIG. 4 is a fragmentary view in section of the wedge housing and wedge as seen in a vertical plane along the line 4—4 of FIG. 1.

It will be recognized from the drawings and the description that the housing pocket 61 and the wedge 71 are substantially rectangular in radial, axial, and circumferential cross section except for the sloping back side faces such as the wedge faces 80b. The housing pocket is defined by generally parallel axial circumferential walls. The parallel end or side walls in the embodiment illustrated in FIGS. 2-4 includes the recesses 62 while the wedge 71 in such embodiment is provided with the end flanges 82. As evident in FIGS. 2-4, the housing pocket is significantly larger in width than the wedge so that the wedge fits very loosely in the pocket. The spaces between the sides of the wedge and the side walls defining the pocket, as obvious in FIGS. 3 and 4, is filled with a solid shearable material 84 which, in the preferred embodiment, is a thermoplastic injected or poured into the pocket around the ends of the wedge while hot and in a liquid state. The material 84 is introduced into the cavity when the wedge is installed in the retainer gland for the purpose holding the wedge in place during the packaging, shipment, and the installation of the gland on a pipe. The extremely loose fit of the wedge in the pocket would permit the wedge to fall out of the pocket unless it is temporarily held in place as by the shearable material. The shearable material flows into the recesses 62 and around the flanges 82. The recesses 62 in the pocket side walls aid in holding the shearable material in place at the ends of the wedge. The flanges 82 on the wedge aid in holding the wedge in place. Such functions of the recesses 62 and the flanges 82 are most clearly evident in FIG. 4. It is to be understood that the shearable material functions only during the packaging, shipment, and installation of the retaining mechanism. Once the operation of the wedge is initiated with the operating screw, the material shears releasing the wedge for radial inward movement into engagement with the pipe. While the preferable shearable material is the thermoplastic, other suitable materials such as a thermosetting plastic, rubber pins, and low shear strength solid metals which can be melted and will set in place, such as lead or zinc, can be used to hold the wedge in the pocket temporarily.

While the loose fit of the wedge 71 in the pocket 61 permits the use of the shearable material to temporarily to hold the wedge in place, there are other advantages inherent in the loose fit and the spherical shape of the operating end 65 of the screw 64. Similar prior art devices require the engaging member of the device, such as the wedge 7i, to follow or be guided by the angular orientation of the housing, such as the housing 52. Thus, if a pipe joint formed with prior art devices is deflected during assembly, but prior to engagement with the pipe surface, the contact with the pipe surface may be impaired. For example, a tooth on an engaging member, such as the teeth 73 and 74 on the wedge 7i, designed to engage a pipe along a perpendicular line to the pipe surface will not properly grip the pipe surface if disoriented. In contrast, in the present invention, the spherical end 65 of the operating screw and the loose fit of the wedge in the pocket after the material 84 is sheared, allows the wedge to properly orient with the surface of the pipe for maximum contact of the wedge with the pipe at the proper angle. Thus, the wedge automatically orients with the pipe surface independent of the angular orientation of the housing so that the teeth always penetrate the surface at the same angle resulting in no reduction in the thrust restraining ability of the mechanism when the housing is at an angle other than perpendicular with the pipe axis.

Figure 8:
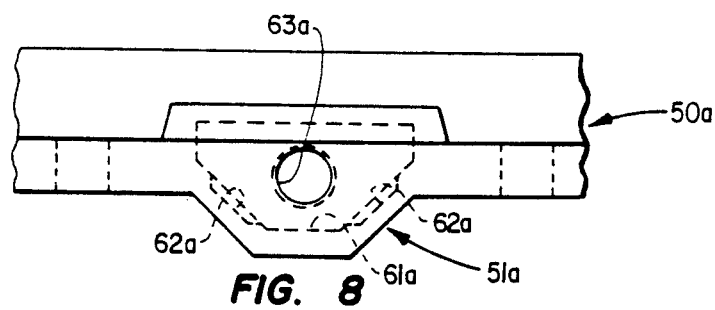
FIG. 8 is a fragmentary top plan view of a modified top wedge housing of a restraining mechanism of a retainer gland as shown in FIG. 1 with the wedge operator screw removed.
Figure 9:
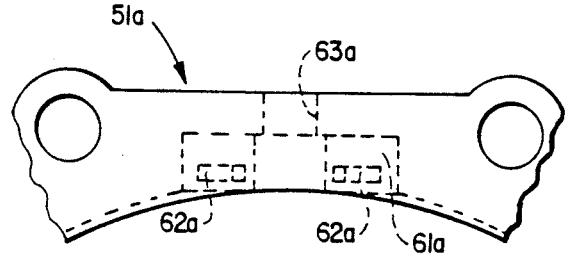
FIG. 9 is a fragmentary front view of the retainer gland portion shown in FIG. 8 illustrating in phantom lines the wedge pocket and the operator screw hole opening into the pocket.
Figure 10:
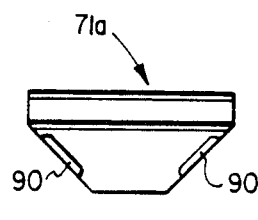
FIG. 10 is top plan view of a modified form of pipe gripping wedge used in the mechanism of FIGS. 8 and 9.
Figure 11:
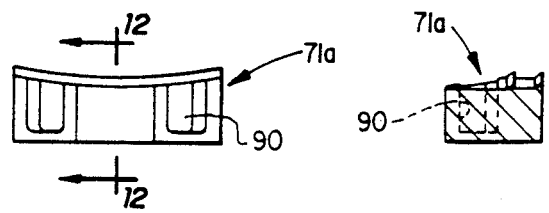
FIG. 11 is a back view in elevation of the wedge of FIG. 10.
Figure 12:
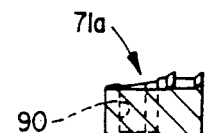
FIG. 12 is a view in section and elevation of the wedge of FIGS. 10 and 11 as seen along the line 2—2 of FIG. 11.

The device of the invention may be applied to a very broad range of pipe sizes, for example, from 4 inch pipe to as large or larger than 24 inch pipe. In such larger sizes it may be desirable to minimize the radial thickness or height and length of the wedge and housing pocket as illustrated in FIGS. 8–12. In such alternate embodiment, the pipe restraining mechanism and similar features of the components of such mechanism as described in connection with the mechanism 51, shall be referred to by the same reference numerals with the postscript "A" added. Referring to FIGS. 8 and 9, the mechanism 51A has a pocket 61A provided with recesses 62A for deposit of the shearable material along the tapered back wall surfaces of the pocket as best seen in FIG. 8. The wedge 71A that fits in the pocket 61A, as seen in FIGS. 10, 11, and 12, similarly, has recesses 90 in the tapered back walls of the wedge. It will be apparent that in the wedge 71A, the flanges 82 which are present on the wedge 71 have been eliminated and the recesses 90 have been substituted. The recesses 62A and the recesses 90 perform exactly the same function in the modified form of the restraining mechanism shown in FIGS. 8–12, as the recesses 62 in the pocket and the flanges 82 on the wedge of the mechanism 51. When the wedge 71A is installed in the pocket 61A and the shearable material 84 is deposited in the pocket between the pocket walls and the wedge walls, the material flows into the pocket recesses 62A and into the wedge recesses 90 to better hold the wedge in the pocket during packaging, shipment, and installation of the mechanism on a pipe.

A preferred use of the pipe restraining mechanism 51 of the invention is as a component of a pipe joint restrainer gland, such as the gland 50 illustrated in FIG. 1. Referring to FIGS. 13–19, the gland 50 is used to grip an end portion of a pipe 100 at a coupling 101 of the pipe with a bell 102 on a pipe 103 The bell includes a flange 104 for attaching the retainer 50 to the bell to complete the coupling of the pipe 100 with the pipe 103.

Figure 13:
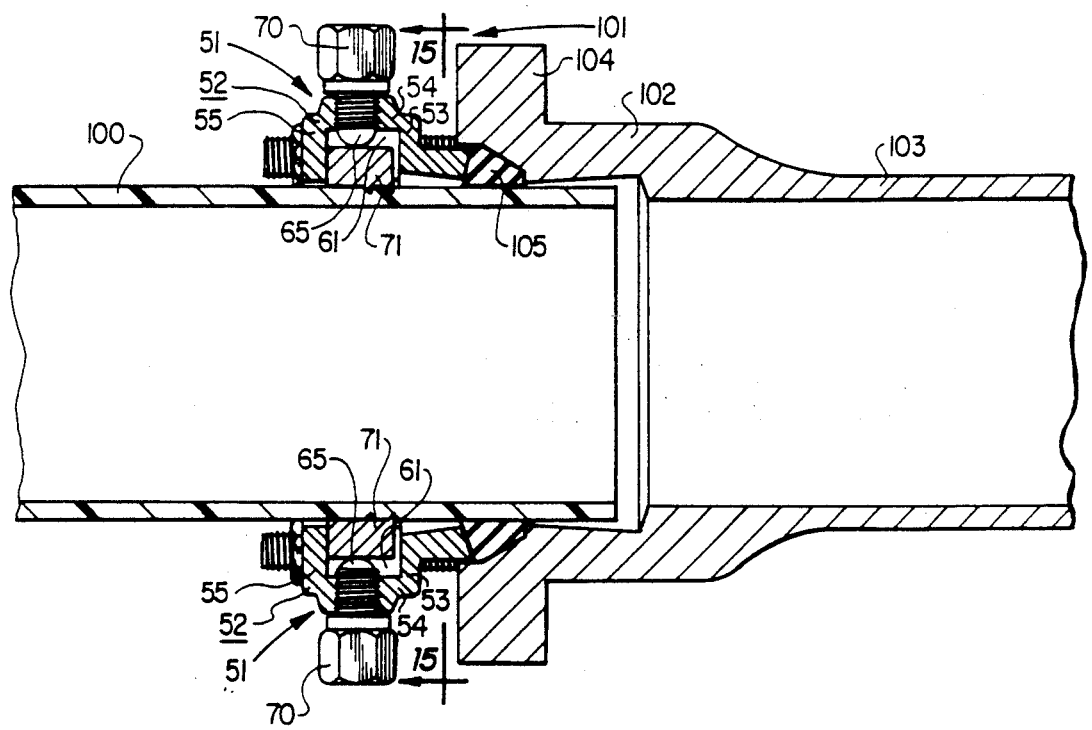
FIG. 13 is a fragmentary view in section and elevation illustrating a pipe coupling including the retainer gland of FIG. 1 in use on a pipe end telescoped into a bell end on a axially aligned pipe showing the pipe gripping wedges of the pipe restraining mechanisms of the invention fully engaged with the pipe end.

The assembly of the coupling 101 begins with the installation of the retainer 50 on the end portion of the pipe 100. Since the retainer 50 is not a split retainer, the retainer is placed over the end of the pipe 100 and moved onto the pipe sufficiently for the end of the pipe to telescope into the bell 102 to the position shown in FIGS. 13 and 14. After placing the retainer on the pipe end, an annular seal or gasket 105 is placed on the pipe for sealing in the flange 104 between the flange and the retainer 50. When the retainer is placed on the pipe end, the operator screws 64 and the wedges 71 are at the retracted positions represented in FIGS. 4 and 16. The wedges are held at such retracted positions by the shearable material 84, as best understood by reference to FIG. 4. As previously stated, the shearable material firmly holds the wedges in the retracted positions until the operator screws 64 are turned to drive the wedges radially inwardly. With the retainer and the gasket on the pipe 100, the pipe is telescoped into the bell 102 with the gasket 105 being seated in the flange 104 as illustrated in FIG. 13. The retainer 50 is secured to the flange 104 by bolts 110 provided with heads 111 which rest against the face of the flange. The bolts 110 pass through holes 112 in the retainer ring. Nuts 113 are screwed on the bolts against the retainer ring to hold the retainer ring to the flange. Pulling the retainer toward the flange with the bolts forces the gasket 105 into a sealing relationship within the flange around the pipe 100.

Figure 14:
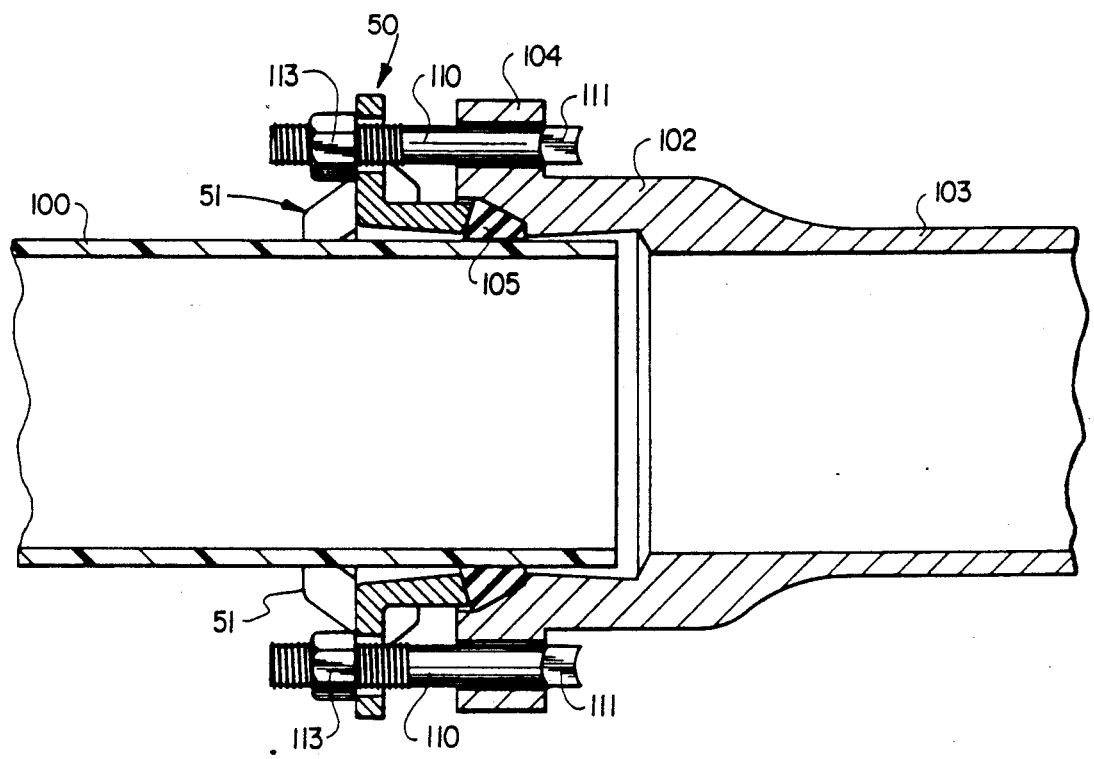
FIG. 14 is view in section and elevation of the pipe coupling of FIG. 13 taken in a plane rotated 45 degrees from the plane of illustration of FIG. 13.

With the retainer 50 on the pipe 100 and attached to the bell flange 104 as represented in FIGS. 13, 14, and 16, and the wedges 71 and screws 64 retracted as seen in FIG. 16, the pipe restraining mechanisms 51 are operated to grip the pipe 100. With the wedges 71 in the initial retracted positions as seen in FIG. 16, the screw axis 114 is spaced from the wedge tooth 73 toward the back wall 52 of the housing pocket. These relative positions of the operator screw and the wedge tooth 73 provides a moment arm about the wedge tooth 73 measured by the distance between the screw axis 114 and a line 115 in alignment with the tooth 73 as seen in FIG. 16. The first step in the engagement of the wedges 71 with the surface of the pipe 100 then begins with the turning of the operator screw 64 using a wrench applied to the screw head 70. The screw is advanced downwardly as viewed in FIG. 16 into the housing pocket as represented in FIG. 17. A radial downward force is applied by the screw 64 through the spherical end 65 of the screw to the top of the wedge 71 shearing the material 84, releasing the wedge, and thereafter forcing the wedge downwardly. When the tooth 73 engages the pipe surface the downward force of the screw and is applied to the wedge creating a turning force having a moment arm measured by the distance between the axis of the screw and the tooth 73 as represented in FIG. 16 between the lines 114 and 115. The screw is operated to rotate the wedge toward the back of the pocket to the position of FIG. 17 at which the lower back corner 71a or the wedge engages the pipe surface, and the tooth 73 engages the pipe surface toward the front of the pocket as seen in FIG. 17. When the lower back corner 71a of the wedge engages the pipe surface, the tooth 73 will begin to bite into the pipe surface. This first step of the engagement of the wedge with the pipe surface by the operator screw starts the initial partial insertion of the wedge teeth into the pipe surface, but because of the length of the teeth the wedge cannot be fully engaged using the screw alone. A radial force large enough to insert the teeth cannot be applied to the screw without over deflection or general indentation of the pipe surface. The use of the torque limiting screw head 70 therefore controls the amount of torque applicable to the screw and a screw head is selected to limit the torque to a value of which will not damage the pipe. If a torque limiting screw head is not employed, a torque wrench can be used to limit the amount of torque applied to the screw. Another factor affecting this first stage of forcing the wedge downwardly against the pipe is the distance of insertion of the screw end 65 into the housing pocket. This is a factor in the design of the mechanism and is determined by how far the screw must travel to force the wedge downwardly to the position of FIG. 17 at which the initial entry of the wedge tooth 73 begins.

This first step sufficiently sets the coupling for the pipe to carry internal pressure. The second and third stages of engagement of the wedge with the pipe surface are then effected by hydraulic pressure in the pipe tending to force the pipe away from the bell to the left as viewed in FIGS. 16–19. When the initial engagement of the tooth 73 and the lower back corner 71a of the wedge is established, the second step of gripping the pipe with the wedge begins as a wedging action between the screw and the wedge. As apparent in FIG. 17, the top surface of the wedge 71 is inclined downwardly toward the back of the wedge forming an inclined plane with the operator screw end 65. At this stage in the movement of the wedge, the back faces 80a and 80b of the wedge are still spaced forward away from the back walls of the pocket. The tooth 73 of the wedge is biting into the pipe surface. The hydraulic pressure in the pipe is increasing and with the tooth 73 biting into the pipe surface the wedge is forced toward the back of the pocket by the moving pipe with a wedging action occurring between the spherical end 65 of the screw and the top sloping surface of the wedge. As the hydraulic pressure forces the pipe 100 to the left carrying the wedge with the pipe, and because the spherical end 65 of the operator screw cannot move upwardly, the wedging action on the wedge by the screw end forces the wedge farther downwardly into the pipe with the teeth 73 and 74 biting into the pipe surface. This wedging action and continued biting of the wedge teeth into the pipe surface continues as the pipe drags the wedge to the back wall of the pocket. The wedge first contacts the back wall of the pocket at the upper back corner 71b of the wedge as represented in FIG. 17. Moderate internal hydraulic pressure will carry out this second step in the engagement of the wedge. Since the wedging action coupled with the hydrostatic forces creates an extreme radial force, the wedging must be strictly controlled. This control is provided by the limiting the distance over which the action may take place. As the Wedge moves back, the teeth are inserted more and slight rotation of the wedge occurs. When the upper back corner 71b of the wedge engages the back pocket wall, the wedging action ceases. In the embodiments of the invention used with PVC pipe, wherein the force required to insert the teeth is comparatively small, the mechanism is designed to provide a short travel distance of the wedge over which the wedging action with the screw occurs. This is the distance between the position of the wedge when the screw has rotated the wedge to a position at which the lower back corner 71a engages the pipe and the position when the upper back corner 71b of the wedge engages the back wall of the pocket. By making this distance small, the wedging action will be completed at a low pressure. This distance, of course, will vary depending upon hardness of the pipe being restrained. For PVC pipe, this distance has been found to be approximately 1/16 of an inch.

The third and last stage of the engagement of the wedges 7 with the surface of the pipe 100 is effected by a still further increase in the hydrostatic pressure in the pipe at the coupling. As previously described, the wedging action is complete when the upper back corner 71b of the wedge engages the back wall of the pocket, as seen in FIG. 18. At this stage, the front tooth 74 may or may not be engaged in the pipe surface. If the two teeth on the wedge are not fully inserted into the pipe when the top corner of the wedge contacts the back wall of the pocket, the wedge may be further rotated clockwise as viewed in FIG. 18 by the increasing hydrostatic pressure. As the hydrostatic increases, the axial thrust applied to the pipe 100 increases. With the teeth biting into the pipe surface, the force of the pipe on the teeth causes the wedge to rotate about the upper back corner 71b from the position of FIG. 18 to the final full contact position of FIG. 19. The force of the pipe of the wedge with the wedge against the back wall of the pocket causes the wedge to move in a rotating motion downwardly to the position of FIG. 19 at which the teeth are fully engaged in the pipe surface and the bottom face of the wedge rests on the surface of the pipe. The back face of the wedge is then engaged with the back face of the pocket. The upper back corner of the wedge is no longer a pivot axis for the wedge. Any further force on the wedge with a tendency to rotate the wedge will develop about the bottom corner 52c of the back wall of the housing. The moment created by the axial thrust on the wedge times the distance to the pivot point at the top corner 71b of the wedge has now been reduced to the axial thrust times the distance between the pipe surface as the force is applied to the wedge teeth and the bottom corner 52c of the housing, greatly reducing the radial force of the wedge against the housing once the wedge is fully seated on the surface of the pipe. This provides a particular advantage in the use of the mechanism of the invention in that continued increases in the hydrostatic pressure in the pipe does not directly produce corresponding increases in the radial force of the wedge against the pipe, and thus, protects the pipe against excessive indentation and also against breakage of the retainer body holding the restraining mechanisms around the pipe. In the preferred embodiment when used on a 12 inch PVC pipe with an outside diameter of 13.20 inches the reduced moment and consequent reduced radial force was only 10% of the original force on the pipe by the wedge. When used on a 12 inch PVC pipe of 12.75 inches outside diameter, the radial force was reduced to 37% of the original. The top of the wedge no longer engages the lower end of the screw and the wedge is loosely trapped in the pocket. This permits the continued increases in pressure in the pipe without corresponding damage to the pipe and retainer assembly.

In experimental pressure tests on 12 inch pipe, the pipe restraining mechanism has sustained pressures well in excess of the minimum burst pressure requirement on DR 18 and DR 25 AWWA C900, as well as American Society for Testing Materials (ASTM) Standard 2241, SDR 21, IPS pipe. The 12 inch device is also been tested on pipe machined from American Water Works Association (AWWA) Standard C900, DR 18 pipe to an outside diameter of 12.75 inches and dimension ratio of approximately DR 25.

The size of the pipe 100 on which any given pipe restraining mechanism assembly 50 is installed may vary to some extent in diameter. It will be apparent that as the diameter of the pipe on whfch the assembly is installed increases, the wedge 71 and the operator screws 64 are not required to move radially inwardly as far as with smaller sizes. To accommodate the larger sizes by limiting the inward movement of operating screws, a spacer, such as the spacer 116, FIG. 1, may be placed on the screw shank to limit how far the screw can be turned to extend the lower end of the screw into the housing pocket against the wedge. Obviously, only relatively small differences in pipe size may be accommodated by the use of a spacer because of other factors, such as the proper sizing of the assembly housing to properly hold the ring seal 105 in place in the bell flange 104.

While the mechanism of the invention has been described and illustrated in FIGS. 1-19 as primarily used with PVC pipe, it is to be understood that the mechanism also may be used with metal pipes, such as ductile iron. A pipe coupling with such harder materials is capable of operating under higher internal pressures and requires a greater force to properly engage the wedge teeth in the pipe surface. To accommodate the materials such as ductile iron, the mechanism of the invention is modified as illustrated in FIGS. 20-23 which show the use of a pipe restraining mechanism 51B which is identical to the mechanism 51 with the exception of a modification of the relationship between the front to back dimension of the wedge and the front to back dimension of the housing pocket. The mechanism 51B uses a wedge 71B and wedge spacer 120. The distance in the pocket from the front to back walls is substantially greater to allow more travel by the wedge 71B during the second and third steps of engaging the wedge with pipe surface. The wedge 71B is held in position in the housing pocket using the shearable material 84. Additionally, the spacer 120, which is of a material which fractures when subject to compression, is placed between the back walls of the wedge and the pocket to fill increased space between the wedge and the back of the pocket during packaging, shipping, and installation. The spacer 120 can be formed of material similar to or the same as the shearable material 84. The operation of the mechanism 51B on ductile iron pipe is identical to the sequence of operational steps described with respect to FIGS. 16-19. After a retainer including the modified mechanisms 51B is installed on ductile iron pipe 100B, the operating screws 64 are turned to advance the screws into the housing pocket. The operator screws rotate the wedges counterclockwise, as viewed in FIG. 20, crushing the spacer 120 releasing the wedge to turn downwardly toward the back of the pocket to the position of FIG. 21 at which the lower corner edge of the spacer engages the pipe surface and starts the wedge tooth 73B into the surface of the pipe. Hydraulic pressure is increased in the pipe tending to move the pipe toward the left as viewed in FIG. 21. The wedge 71B is dragged along the pocket toward the back of the pocket due to the engagement of the tooth 73B in the pipe surface. The wedging action with the lower end of the operator screw rotating the wedge clockwise with the teeth 73B and 74B being embedded farther into the pipe surface. When the upper back corner of the wedge strikes the back wall of the pocket, the wedging action ceases and the force of the pipe on the teeth of the wedge rotates the wedge farther clockwise about the upper back corner of the wedge as the turning axis until the teeth are fully embedded in the pipe surface and the back face of the wedge engages the back face of the pocket as illustrated in FIG. 23. Thus, the operation of the mechanism 51B with ductile iron pipe is substantially identical to that with PVC pipe with the exception of the greater travel distance of the wedges to adapt the mechanism to the higher pressures sustainable by ductile iron pipe, and apply greater radial forces downwardly on the wedges to firmly bury the teeth of the wedges in the ductile iron pipe surface.

Figure 24:
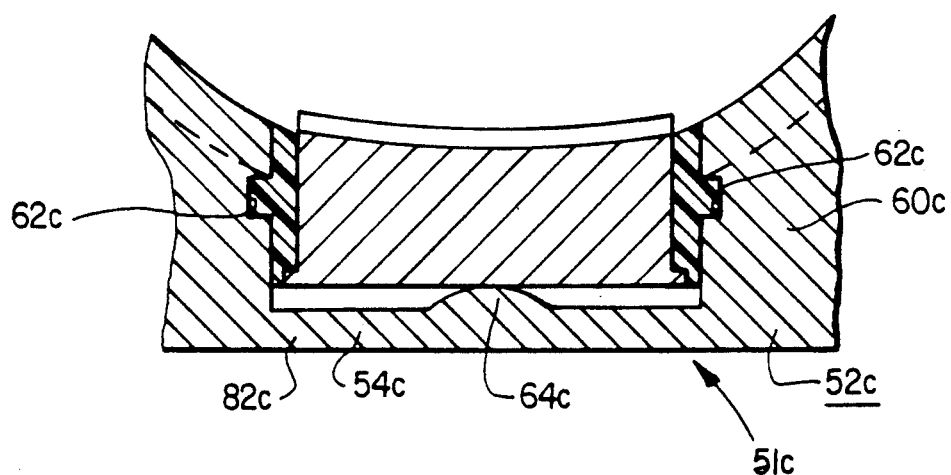
FIG. 24 is a fragmentary view in section similar to FIG. 4 illustrating a modification in the restraining mechanism which may be used with a split ring type of retainer gland.

While the preferred embodiment of the invention has been illustrated and described as using the operator screw 64, a modified form as in FIG. 23 may be used in those instances where the mechanism of the invention is applied to a split ring restrainer gland, including applications where a harness is employed, such as shown in U.S. Pat. No. 4,568,112, issued to Earl C. Bradley, et al, Feb. 4, 1986. In FIG. 24 the corresponding features of the mechanism illustrated in FIG. 4 are referred to by the same reference numerals as used in FIG. 4 with the suffix "C" added. In the modified mechanism 51C the operator screw 64 has been eliminated and the housing top wall 54 has been modified to include a ball or spherical shaped protrusion 64C which engages the wedge 71A effecting the same application of force to the wedge as applied by the end of the operator screw 64. One further modification in the relationship between the wedge and the wedge housing is the provision of additional space between the wedge and the top wall 54C of the housing to allow some pivoting of the wedge relative to the protrusion so that the wedge will readily self orient to the surface of the pipe as the wedge engages the pipe. It will be apparent that the wedges included in the mechanisms 51C in a split ring form of restrainer gland are forced against the pipe as the two rings of the gland are brought together, such as when the bolts 32 are tightened as in FIG. 5 of the U.S. Pat. No. 4,568,112. As the rings are forced together by the bolts, the protrusion 64A drives the wedge against the pipe's surface in the same manner as the end of the operator screw 64. The internal pressure induced steps of fully seating the wedge against the pipe occur in the same manner as with the other forms 51A and 51B of the mechanism.

The mechanism of the invention is readily adaptable to a wide range of pipe sizes and a variety of forms of pipe coupling apparatus, such as mechanical joint glands, flanges, push-on pipe bells, harnesses, and other restraining devices for holding plastic and/or metal pipe together and for holding various pipe fittings with plastic or metal pipe. As previously stated, the mechanism has the ability to create the necessary grooves to restrain high pressures in PVC and metal, such as ductile iron pipe, and after creation of the grooves, the radial force which was required to form the grooves is reduced to an absolute minimum for holding the pipe in a coupling. The teeth of the wedges rest in the pipe grooves with a minimum of radial force in comparison to the radial force required to form the grooves. The result is analageous to the formation of grooves by a lathe and thereafter loosely placing an engaging or latching member in the grooves, such as the wedge teeth of the present invention. This lowers the stress in the gland or retainer ring in which the mechanisms of the invention are installed reserving the strength of the pipe wall and the ring to resist axial thrust and internal pressure. In one example of the use of the preferred embodiment of the mechanism of the invention, two grooves 0.08 inches deep and 3 inches long can be formed in a PVC pipe at 8 locations around a 12 inch pipe and at 16 location around a 24 inch pipe.

What is claimed is:

1. A pipe restraining mechanism for gripping the outside surface of a pipe at a connection between said pipe and another member comprising:

a wedge housing having a front wall, a back wall, a top wall, and an open bottom, said housing having internal wall surfaces defining a wedge pocket, said top wall and said back wall being substantially perpendicular defining a top and a back of said pocket, said bottom opening to a pipe surface gripped by said mechanism when said mechanism is in use;

said top wall having a threaded hole opening into said pocket along an axis substantially perpendicular to said top and parallel to said back wall of said pocket;

means connecting said wedge housing to another member for supporting said wedge housing in relation to a pipe gripped by said mechanism with the bottom of said wedge pocket opening to said pipe;

a pipe gripping wedge in said wedge pocket, said wedge being loosely fitted in said pocket and having a back face engageable with said back wall of said pocket, a top face substantially perpendicular to said back face, and at least one pipe surface engaging tooth across the bottom face substantially parallel with said back face of said wedge, said tooth being spaced farther from said back face of said wedge than a longitudinal axis of said hole in said top wall of said housing when said wedge is in operating position in said pocket for creating a turning moment arm in said wedge between the axis of said hole in said top of said housing and a line of engagement of said wedge tooth with said pipe surface; and a wedge operator screw in said hole in said housing top wall, said screw having a lower end adapted to advance into said pocket beyond said top wall of said pocket to engage said top of said wedge along a line coincident with said axis of said hole in said top wall between said tooth and said back face of said wedge to apply a turning force to said wedge to urge said tooth into a pipe surface and to apply a wedging action between said wedge and said screw as pressure in said pipe urges said pipe towards said back wall of said pocket, and said wedge being adapted to be further rotated after said wedging action by pressure responsive movement of said pipe against said wedge tooth to turn said wedge about an axis along the line of contact of the upper back corner of said wedge and said back wall of said pocket to fully engage said tooth and the bottom surface of said wedge with said pipe surface.

2. A pipe restraining mechanism in accordance with claim 1 where said wedge has two spaced teeth across said bottom face of said wedge.

3. A pipe restraining mechanism in accordance with claim 2 where a first of said teeth is located along a bottom front edge of said wedge and a second of said teeth is positioned a across said bottom toward said back face of said wedge between said first tooth and a line of intersection of said axis of said operator screw and said wedge to provide a turning moment art to said wedge when said screw engages said top face of said wedge.

4. A pipe restraining mechanism assembly including a plurality of pipe restraining mechanisms in accordance with claim 2, said pipe restraining mechanisms being included in said assembly in circumferential spaced array in a circular configuration for positioning around said pipe for engaging and restraining said pipe against longitudinal movement away from an adjacent member coupled to said pipe by said assembly.

5. A pipe restraining mechanism in accordance with claim 3 where said screw has a rounded lower end engageable with said top surface of said wedge.

6. A pipe restraining mechanism assembly including a plurality of pipe restraining mechanisms in accordance with claim 3, said pipe restraining mechanisms being included in said assembly in circumferential spaced array in a circular configuration for positioning around said pipe for engaging and restraining said pipe against longitudinal movement away from an adjacent member coupled of said pipe by said assembly.

7. A pipe restraining mechanism in accordance with claim 5 wherein said wedge has surface structure for releasably holding said wedge in said pocket when a shearable compound is injected into said pocket around ends of said wedge to hold said wedge in said pocket until said operator screw is operated.

8. A pipe restraining mechanism assembly including a plurality of pipe restraining mechanisms in accordance with claim 5, said pipe restraining mechanisms being included in said assembly in circumferential spaced array in a circular configuration for positioning around said pipe for engaging and restraining said pipe against longitudinal movement away from an adjacent member coupled of said pipe by said assembly.

9. A pipe restraining mechanism in accordance with claim 7 where said wedge surface structure comprises a flange projecting from each end of said wedge.

10. A pipe restraining mechanism in accordance with claim 9 where said operator screw has a torque limiting head.

11. A pipe restraining mechanism assembly including a plurality of pipe restraining mechanisms in accordance with claim 10, said pipe restraining mechanisms being included in said assembly in circumferential spaced array in a circular configuration for positioning around said pipe for engaging and restraining said pipe against longitudinal movement away from an adjacent member coupled of said pipe by said assembly.

12. A pipe restraining mechanism assembly including a plurality of pipe restraining mechanisms in accordance with claim 9, said pipe restraining mechanisms being included in said assembly in circumferential spaced array in a circular configuration for positioning around said pipe for engaging and restraining said pipe against longitudinal movement away from an adjacent member coupled of said pipe by said assembly.

13. A pipe restraining mechanism in accordance with claim 7 where said surface structure comprises a cavity in each end of said wedge.

14. A pipe restraining mechanism in accordance with claim 13 where said operator screw has a torque limiting head.

15. A pipe restraining mechanism assembly including a plurality of pipe restraining mechanisms in accordance with claim 14, said pipe restraining mechanisms being included in said assembly in circumferential spaced array in a circular configuration for positioning around said pipe for engaging and restraining said pipe against longitudinal movement away from an adjacent member coupled of said pipe by said assembly.

16. A pipe restraining mechanism assembly including a plurality of pipe restraining mechanisms in accordance with claim 13, said pipe restraining mechanisms being included in said assembly in circumferential spaced array in a circular configuration for positioning around said pipe for engaging and restraining said pipe against longitudinal movement away from an adjacent member coupled of said pipe by said assembly.

17. A pipe restraining mechanism in accordance with claim 7 including a spacer on said operator screw between said head and said housing top wall to limit the travel of the inward end of said screw into said pocket to accommodate said mechanism to different sizes of pipe.

18. A pipe restraining mechanism assembly including a plurality of pipe restraining mechanisms in accordance with claim 7, said pipe restraining mechanisms being included in said assembly in circumferential spaced array in a circular configuration for positioning around said pipe for engaging and restraining said pipe against longitudinal movement away from an adjacent member coupled of said pipe by said assembly.

19. A pipe restraining mechanism assembly including a plurality of pipe restraining mechanisms in accordance with claim 1, said pipe restraining mechanisms being included in said assembly in circumferential spaced array in a circular configuration for positioning around said pipe for engaging and restraining said pipe against longitudinal movement away from an adjacent member coupled of said pipe by said assembly.

20. A pipe restraining mechanism in accordance with claim 1 wherein said pocket, said wedge, and said operator screw are sized and shaped to produce sequential engagement of said wedge with a surface of said pipe in a series of steps comprising:
 rotating said screw to advance said screw against the top surface of said wedge to rotate said wedge about said wedge tooth from a position in which a top and front wall of said wedge engage a top and front wall of said pocket to a rotated position at which a back lower corner of said wedge engages said pipe surface and said tooth engages said pipe surface;
 driving said wedge by said pipe responsive to pressure increases in said pipe to move said wedge toward said pocket back wall to effect a wedging action on said wedge between said operator screw and said pipe surface further embedding said tooth into said pipe surface until a top back corner of said wedge engages the back wall of said pocket; and
 rotating said wedge downwardly toward said pipe surface about an axis along the line of contact of said back wall of said wedge with said back wall of said pocket until said back wall of said wedge fully engages said back wall of said pocket and said bottom of said wedge rest on said pipe surface and said tooth is embedded in said pipe responsive to further pressure increases in said pipe urging said pipe away from said coupling of said pipe with said member.

21. A pipe restraining mechanism in accordance with claim 20 where said screw has a rounded lower end for engagement with the top surface of said wedge.

22. A pipe restraining mechanism in accordance with claim 21 where said wedge has a second pipe engaging tooth spaced from said first pipe engaging tooth on said wedge toward said front wall of said wedge.

23. A pipe restraining mechanism assembly comprising a plurality of pipe restraining mechanisms in accordance with claim 20 mounted in a circumferential spaced array in a circular configuration for installation around a pipe for engaging and restraining said pipe against longitudinal movement away from an adjacent member coupled to said pipe by said assembly.

24. A pipe restraining mechanism in accordance with claim 23 where said pipe restraining mechanisms are integral components of a segmented pipe joint restrainer gland.

25. A pipe restraining mechanism assembly in accordance with claim 23 where said pipe restraining mechanisms are components of a coupling selected from a group consisting of mechanical joint glands, flanges, push-on pipe bells, harnesses, and restraining devices for plastic and metal pipes.

26. A pipe restraining mechanism in accordance with claim 20 where said wedge is arcuate to conform to a cylindrical pipe surface and said wedge has surface features for releasably holding said wedge in said pocket when a frangible material is injected into said pocket between said pocket walls and said wedge walls to temporarily hold said wedge in position until said operator screw is operated.

27. A pipe restraining mechanism in accordance with claim 26 where said wedge surface features are end flanges.

28. A pipe restraining mechanism in accordance with claim 26 where said wedge surface features are end surface recesses.

29. A pipe restraining mechanism in accordance with claim 20 wherein said operator screw has a torque limiting head.

30. A pipe restraining mechanism in accordance with claim 20 for use on metal pipe including a frangible spacer in said pocket between the back wall of said pocket and the back face of said wedge to aid in holding said wedge in said pocket until said operator screw is actuated and to permit an increase in the travel of said wedge during the wedging step with said screw.

31. A pipe restraining mechanism for gripping the outside surface of a pipe at a connection between said pipe and another member comprising:
 a wedge housing including means for supporting said wedge housing at a pipe surface, said wedge housing having a wedge pocket therein having a back wall and a bottom opening to a pipe surface when in use;
 a pipe gripping wedge having a pipe gripping tooth disposed in said pocket for radial movement into engagement with pipe surface;
 an operator screw threaded through said housing and extendible into said pocket to engage and drive said wedge against a pipe surface; and
 said pocket, said wedge, said tooth, and said operator screw having interrelated structure for operating said wedge in sequential steps including first engaging said wedge to press said wedge tooth against said pipe surface and rotate a back edge of said wedge against said pipe surface, second, driving said wedge by internal pressure induced pipe movement toward said back wall of said pocket while wedging said wedge toward said pipe between said screw and said pipe to further penetrate said pipe with said tooth until an upper back corner of said wedge engages said back wall of said pocket, and third, further rotating said wedge toward said pipe until said tooth fully penetrates said pipe and a bottom surface of said wedge rests on said pipe responsive to a further increase in said internal pipe pressure.

32. A pipe restrainer mechanism in accordance with claim 31 wherein said wedge housing is a pipe encircling ring provided with a plurality of said wedges mounted in circumferential spaced array around said ring.

33. A pipe restrainer in accordance with claim 32 wherein each said wedge in each said housing pocket is loosely disposed in said pocket and said operator screw having a spherical lower end whereby said wedge is self orienting to said pipe as said wedge is driven into said pipe.

34. A pipe restrainer mechanism for gripping the outside surface of a pipe at a connection between said pipe and another member comprising
- a wedge housing including means for supporting said wedge housing at a pipe surface, said wedge housing having a wedge pocket therein having a bottom opening to a pipe surface when in use;
- a pipe gripping wedge disposed in said pocket for radial movement into engagement with said pipe surface, said wedge having a bottom face and a pipe gripping tooth projecting from said bottom face, said bottom face being engageable with said pipe surface limiting the depth of penetration of said tooth into said pipe;
- an operator screw threaded through said housing and extendible into said pocket to engage and drive said wedge against a pipe surface;
- said wedge being free in said pocket to rotate relative to said pocket and said operator screw;
- said pocket, said wedge, and said operator screw having interrelated structure for driving said wedge with said screw to initially engage said wedge with said pipe, axially moving said wedge with said pipe responsive to internal pipe pressure to effect wedging action between said wedge and said pipe to further drive said wedge tooth into said pipe, and rotating said wedge relative to said operator screw in said pocket to fully engage said tooth in said pipe and seat said wedge bottom face on said pipe and wherein said bottom is substantially parallel to said outside surface of said pipe.

35. A pipe restrainer mechanism in accordance with claim 32 wherein said wedge housing is a pipe encircling ring provided with a plurality of said wedges mounted in said ring in circumferential spaced array.

36. A pipe restrainer in accordance with claim 35 wherein each said wedge in each said housing pocket is loosely disposed in said pocket and said operator screw having a spherical lower end whereby said wedge is self orienting to said pipe as said wedge is driven into said pipe.

37. A pipe restraining mechanism for use in a pipe retainer gland to secure the gland on a pipe including: a housing forming a part of said retainer gland and having a pocket therein opening inside of said gland, an operator screw threaded through the outer wall of said housing and rotatable to drive the inner end of said screw into said housing pocket, and a pipe gripping wedge in said housing pocket having inside teeth and a pipe engaging surface between said teeth for engagement with the outer surface of a pipe to limit penetration of said teeth into said pipe, said wedge being free to rotate in said pocket independent of said operator screw and adapted to be initially mechanically pressed into a pipe surface and thereafter fully engaged with said pipe surface responsive to hydraulic pressure in the pipe causing a wedging action with the operator screw and thereafter a turning action between said wedge and a housing surface to drive said wedge teeth into the pipe surface and seat said wedge surface between said teeth on the pipe surface limiting penetration of said teeth into said pipe surface and wherein said pipe engaging surface is substantially parallel to said outer surface of said pipe.

38. A pipe restrainer mechanism for gripping the outside surface of a pipe at a connection between said pipe and another member comprising:
- a wedge housing including means for supporting said wedge housing at a pipe surface, said wedge housing having a wedge pocket therein having a bottom opening to a pipe surface when in use;
- a pipe gripping wedge disposed in said pocket for radial movement into engagement with said pipe surface, said wedge having a bottom face and a pipe gripping tooth projecting from said face, said bottom face being engageable with said pipe surface limiting the penetration of said tooth into said pipe;
- wedge operator means in said housing and extendible into said pocket to engage and drive said wedge against a pipe surface, said wedge being free in said pocket to rotate relative to said operator means and said pocket; and
- said pocket, said wedge, and said wedge operator means having interrelated structure for driving said wedge to initially engage said wedge with said pipe, axially moving said wedge with said pipe responsive to internal pipe pressure to effect wedging action between said wedge and said pipe to further drive said wedge tooth into said pipe, and rotating said wedge to fully engaging said tooth in said pipe and seat said wedge bottom face on said pipe limiting penetration of said tooth into said pipe and wherein said bottom face is substantially parallel to said outside surface of said pipe.

39. A pipe restrainer mechanism in accordance with claim 38 where said wedge operator means is an operator screw in the top wall of said housing.

40. A pipe restrainer mechanism in accordance with claim 38 wherein said wedge operator means is a protuberance in said housing extending into the top of said pocket from the top wall of said pocket to engage said wedge and drive said wedge tooth into said pipe when said wedge housing is forced toward said pipe.

* * * * *

UNITED STATES PATENT AND TRADEMARK OFFICE
CERTIFICATE OF CORRECTION

PATENT NO. : 5,071,175                                             Page 1 of 2
DATED      : December 10, 1991
INVENTOR(S): Harold Kennedy, Jr.

It is certified that error appears in the above-identified patent and that said Letters Patent is hereby corrected as shown below:

| | |
|---|---|
| Column 4, line 17 | Delete "2-2"<br>Insert --12-12-- |
| Column 4, line 43 | Delete "t"<br>Insert --to-- |
| Column 5, line 66 | Delete "had"<br>Insert --has-- |
| Column 6, line 13 | After "axial"<br>Insert --and-- |
| Column 6, line 56 | Delete "7i"<br>Insert --71-- |
| Column 6, line 62 | Delete "7i"<br>Insert --71-- |
| Column 8, line 27 | Delete "a-plied"<br>Insert --applied-- |
| Column 8, line 31 | Delete "and"<br>Insert --end-- |
| Column 8, line 38 | Delete "or"<br>Insert --of-- |
| Column 9, line 34 | Delete "Wedge"<br>Insert --wedge-- |

UNITED STATES PATENT AND TRADEMARK OFFICE
CERTIFICATE OF CORRECTION

PATENT NO.   : 5,071,175

DATED        : December 10, 1991

INVENTOR(S)  : Harold Kennedy, Jr.

It is certified that error appears in the above-indentified patent and that said Letters Patent is hereby corrected as shown below:

Column 9, line 53                    Delete "7"
                                     Insert --71--

Signed and Sealed this

Seventh Day of September, 1993

Attest:

BRUCE LEHMAN

Attesting Officer          Commissioner of Patents and Trademarks

UNITED STATES PATENT AND TRADEMARK OFFICE
CERTIFICATE OF CORRECTION

PATENT NO. : 5,071,175

DATED : December 10, 1991

INVENTOR(S) : Harold Kennedy, Jr.

It is certified that error appears in the above-identified patent and that said Letters Patent is hereby corrected as shown below:

Column 17, Line 33    Delete "32"
                      Insert --34--

Signed and Sealed this

Twenty-first Day of December, 1993

*Attest:*

BRUCE LEHMAN

*Attesting Officer*    Commissioner of Patents and Trademarks